Figure 1:
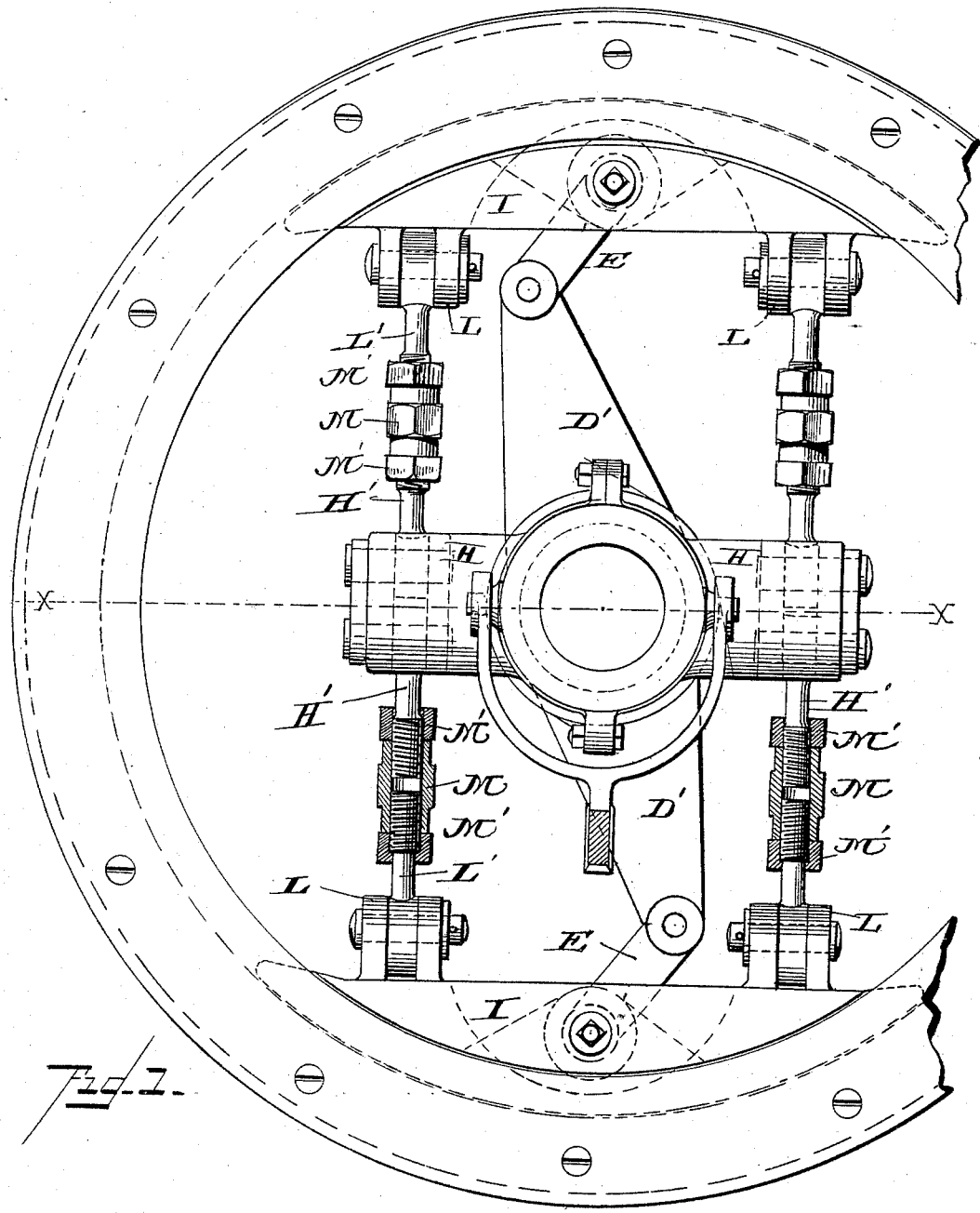

(No Model.) 4 Sheets—Sheet 1.

T. McBRIDE & E. FISHER.
FRICTION CLUTCH.

No. 442,076. Patented Dec. 2, 1890.

WITNESSES
H. M. Sterling
Jas. H. Welch

INVENTORS
T. McBride & E. Fisher
by S. M. Gunsabaugh
Attorney (No Model.) 4 Sheets—Sheet 2.
T. McBRIDE & E. FISHER.
FRICTION CLUTCH.
No. 442,076. Patented Dec. 2, 1890.
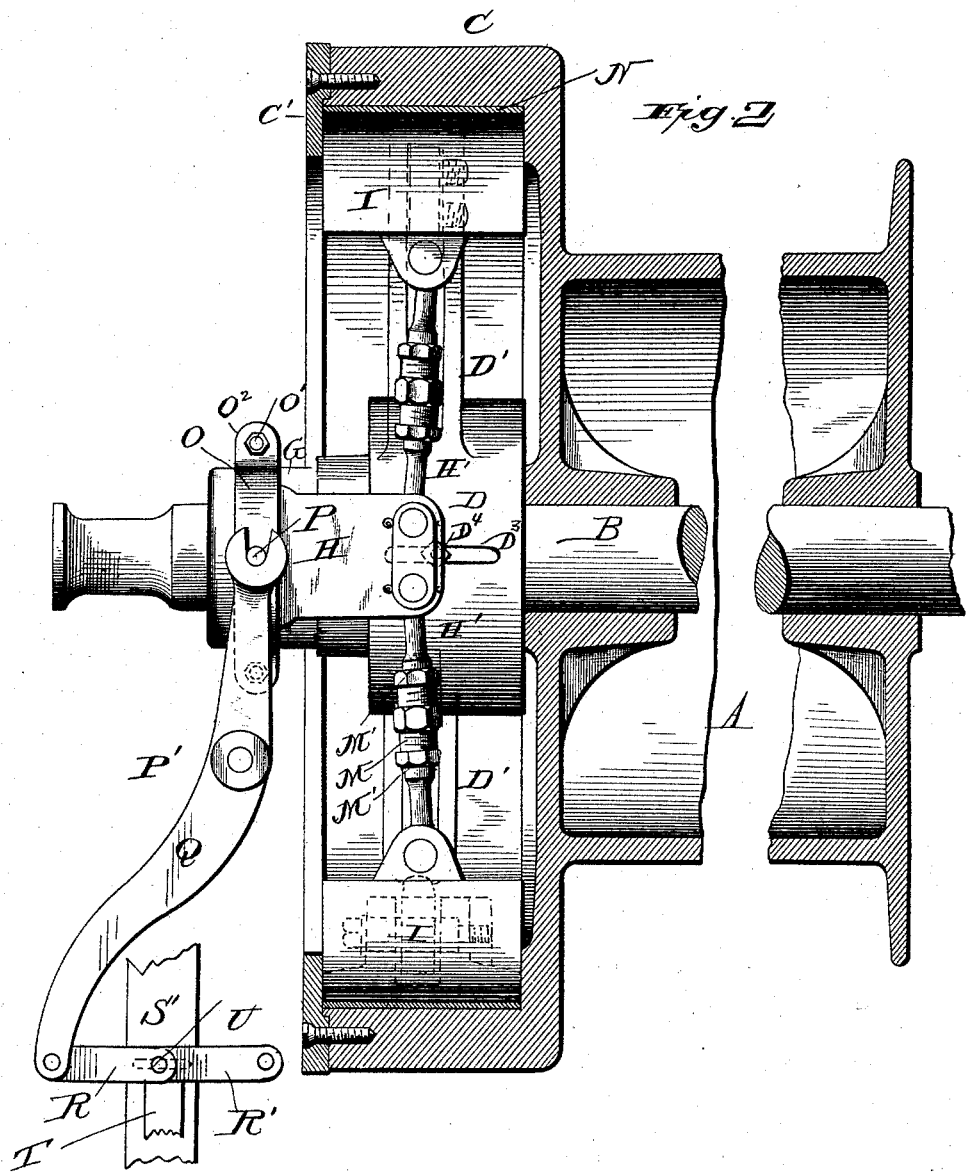

(No Model.) 4 Sheets—Sheet 3.
T. McBRIDE & E. FISHER.
FRICTION CLUTCH.
No. 442,076. Patented Dec. 2, 1890.
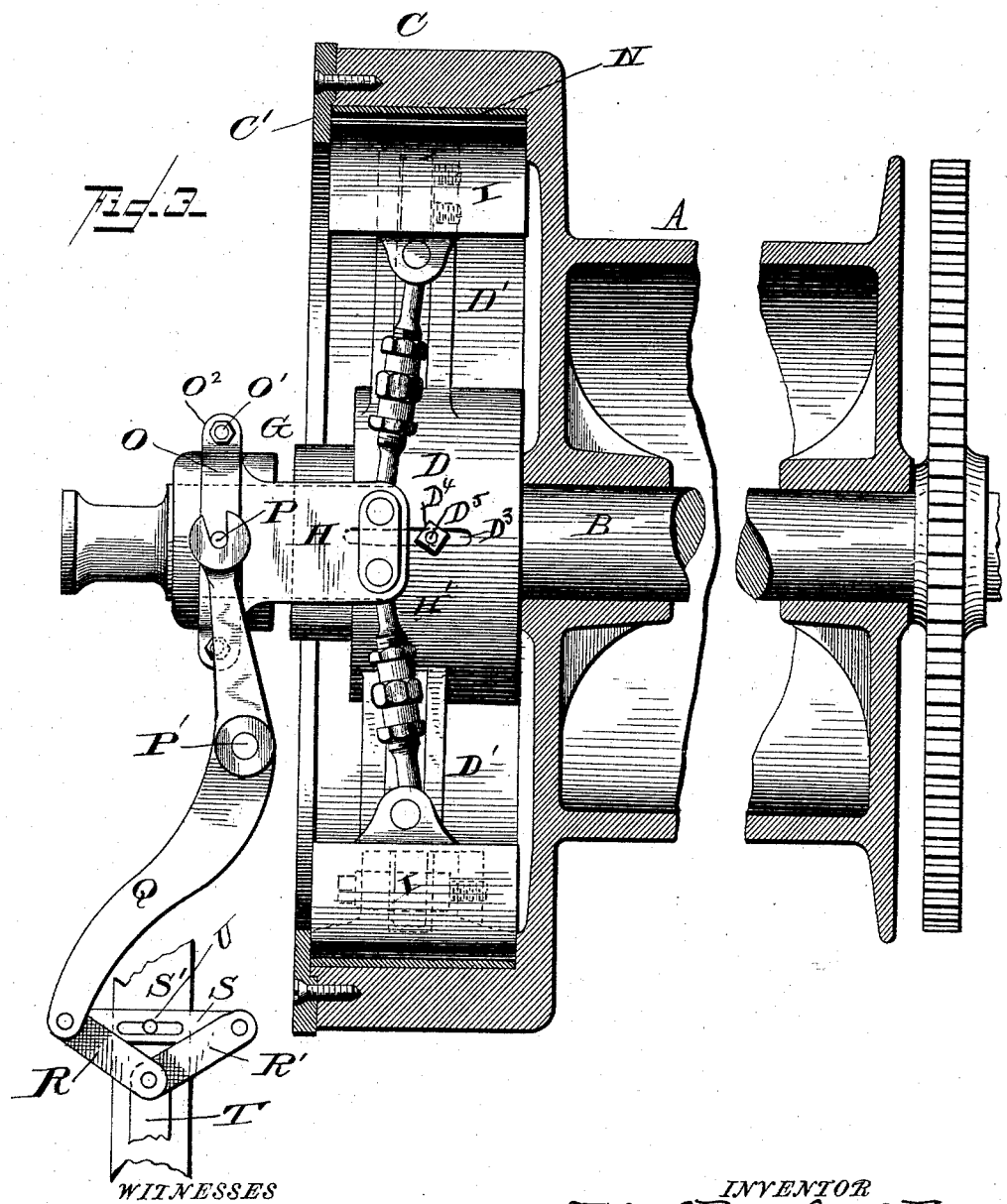
WITNESSES
H. M. Sterling
Jas. H. Welch
INVENTOR
T. McBride & E. Fisher
by S. N. Sinsabaugh
Attorney

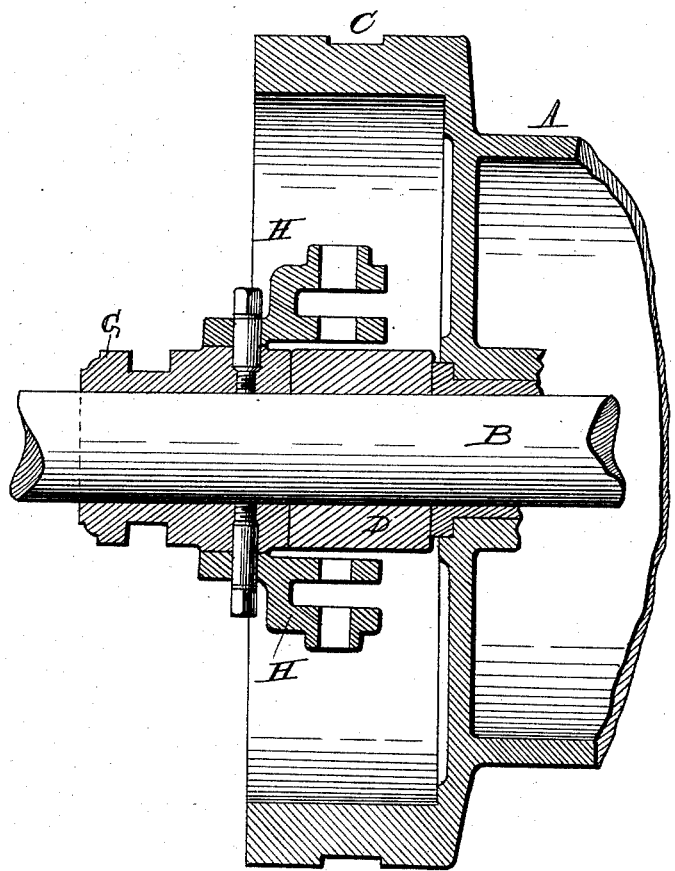

UNITED STATES PATENT OFFICE.

THOMAS McBRIDE, OF PHILADELPHIA, PENNSYLVANIA, AND EBENEZER FISHER, OF KINCARDINE, CANADA.

FRICTION-CLUTCH.

SPECIFICATION forming part of Letters Patent No. 442,076, dated December 2, 1890.

Application filed July 11, 1890. Serial No. 358,386. (No model.)

*To all whom it may concern:*

Be it known that we, THOMAS McBRIDE, a citizen of the United States, residing in the city and county of Philadelphia, Pennsylvania, and EBENEZER FISHER, a subject of the Queen of Great Britain, residing at Kincardine, in the Province of Ontario, Dominion of Canada, have invented new and useful Improvements in Friction-Clutches; and we do hereby declare the following to be a full, clear, and exact description of said invention, reference being had to the accompanying drawings, and to the letters of reference marked thereon, which form a part of this specification.

Our invention relates to improvements in friction-clutches wherein the drum or band-wheel is mounted loosely on the shaft and is engaged and caused to travel therewith by the engagement of friction blocks or shoes to revolve with the shaft; and our invention consists in connecting the shoes through links with independent sleeves — one mounted loosely on the shaft and the other connected thereto through a feather—whereby the shoes are first acted upon by the links connecting them with the loose sleeve, and afterward caused to follow with and engage the friction-face by the links connecting them with the feathered sleeve, acting thereon to prevent the entire exclusion of the air between the surfaces, and consequently permit the shoes to readily leave the friction-rim when desired to throw the rim or band-wheel out of action.

Our invention further consists in connecting the shoes at their ends through links with a sleeve loosely mounted on the shaft, and centrally thereof through links with a sleeve loosely keyed thereon, and a shipping-lever for moving the loose sleeve to cause the shoes to engage the rim of the drum.

It further consists in certain novel features in the construction and arrangement of parts, all as hereinafter explained.

In the accompanying drawings, Figure 1 is a face view of the drum and friction-rim thereon, showing the loose sleeve with the projecting bearings with the adjustable links connecting the same with each end of the shoe, also the hub feathered on the shaft with its links for connecting it with the center of the shoe. Fig. 2 is a transverse section through the drum and friction-rim, showing the shaft and hubs in full lines, and showing one manner of mounting and connecting the operating-lever for the loose sleeve. Fig. 3 is a similar view showing another manner of mounting the lever. Fig. 4 is a section on the line $x\ x$, Fig. 1, with the links removed.

The drum or band-wheel A may be of any preferred form and mounted loosely upon the driving-shaft B, to which shaft motion can be communicated in any preferred way.

The drum A is provided with an enlarged projecting friction-rim C, and has bolted or otherwise secured to its outer side face a ring C' to overhang the inner face of the rim to form a guideway for the shoe or blocks hereinafter referred to.

Mounted on the shaft by means of a pin $D^4$ or bolt mounted in or connected to the shaft and an elongated slot $D^3$ in the sleeve and a nut $D^5$, by means of which the sleeve may be adjusted and held at any desired position on the shaft within the rim, is a sleeve D, having formed or otherwise connected therewith lugs or ears D', projecting out at an angle from the hub on opposite sides of the face and in line with each other, and to the ends of which are connected links E, connected in turn to the center of the blocks or shoes I, which point of connection is in line with the center of the hub, so that the lugs and links shall stand at an angle to each other. Mounted loosely on the shaft outside the hub or sleeve D is a sleeve G, which has bolted or otherwise connected to the peripheral face bifurcated or slotted bearing-plates H, in which are pivotally mounted one end of a link or rod H', hereinafter referred to.

The blocks or shoes I are made in the form of a segment of a circle and have formed near each end inwardly-projecting lugs or ears L, in which are mounted a link or rod L', the link L', as also the link H', being provided at their ends with screw-threads, and the ends of said links being connected together by a screw-threaded sleeve M to permit the length to be increased or diminished to compensate for wear upon the rim or shoes or bearings and prevent lost motion, the parts being held in their adjustable position by jam-nuts M'. The working-faces of the shoes are covered with leather N or similar material to form a proper gripping-face.

The sleeve G is provided with a circumferential groove to receive a divided band or ring O, fitting within the same and secured together and in position by bolts O', passing through lugs O², and projecting from the outer face of said band or ring are lugs P.

Pivotally mounted on the frame of the main machine at P' is a lever Q, having one end bifurcated or forked to embrace the ring or band O, and having its end notched to receive the lugs P. The opposite arm of the lever Q is curved outward away from its pivotal support, and is connected at its end to one arm R of a toggle-link, and having the end of the other arm R' connected to a plate S, secured to a suitable support S' on the frame, and the two arms having secured thereto at their point of connection the operating-rod T, carried to and operated from any convenient point on the machine.

The plate S is made adjustable to set the toggle-links at a greater or less angle to each other to regulate the throw and regulate the power necessary to actuate the shipping-lever.

In Fig. 2 a modification in the manner of mounting and connecting the toggle-links to the frame and operating-rod, in which case the arm R' is connected to a fixed pivot, and the inner or connected ends are slotted and are connected together and to the rod by means of a bolt U, which permits the lengthening or shortening of the links, for a purpose as before described.

The rod or links L' H', which connect the loose collar with the blocks or shoes, incline from their bearings to their points of connection with the shoes, the two pairs on each side acting as toggle-links between the two shoes on each side of the main shaft, but are kept at such adjustment that they shall not be brought in a parallel line or to a dead-center, which, while permitting the shoes to grip the rim with sufficient force to engage the drum or band-wheel with the shaft, that the same can be readily disconnected therefrom.

The operation is as follows: When it is desired to engage the drum with the shaft, the operating-rod is moved back, straightening out the toggle-links connecting the lever, causing the lever to move the loose sleeve inward, forcing the links connected to the shoes inward at their point of connection with the sleeve, and causing the shoes to be forced outward into engagement with the rim as the shoes grip the face. The links connecting the same with the sleeve feathered on the shaft cause all the parts to travel together, and the links of the feathered sleeve act to press the shoe into closer engagement with the rim, but in such manner as to prevent the entire exclusion of the air between the gripping-faces, which acts, when it is desired to disconnect the parts, to permit them to readily leave each other, which would not be the case were the air entirely excluded between them, as the smooth or flat faces under such circumstances would hang or hold together.

By the construction and arrangement it will be observed that by putting the friction in the drums all friction is removed from the engine, and that the load can be raised or lowered without changing from one lever to another, and that with a power of about five pounds a load from eight to ten tons can be raised or lowered.

Having now described our invention, what we claim, and desire to secure by Letters Patent, is—

1. In a friction-clutch, the shoes connected through links with independent sleeves, one mounted loosely and the other keyed on the shaft, substantially as and for the purpose set forth.

2. In a friction-clutch, the shoes connected at their ends through links with a sleeve loosely mounted on the shaft and centrally thereof through links with a sleeve loosely keyed thereon, and a shipping-lever for moving the loose sleeve to cause the shoes to engage the rim of the drum, substantially as and for the purpose set forth.

3. In a friction-clutch, the shoes connected at their ends through links with a sleeve loosely mounted on the shaft and centrally through links with a sleeve loosely keyed thereon, the lever connected to the sleeve, and the operating-bar connected to the lever through the toggle-links, substantially as set forth.

4. In a friction-clutch, the sleeve, the shoes and links for connecting the same, an operating lever and bar, and the adjustable toggle-links for connecting the operating lever and bar, substantially as set forth.

In testimony whereof we affix our signatures in the presence of two subscribing witnesses.

THOMAS McBRIDE.
EBENEZER FISHER.

Witnesses:
GEO. McBRIDE,
RICHARD KEARNY,